United States Patent [19]

Yoak et al.

[11] 4,016,958
[45] Apr. 12, 1977

[54] MOTION TRANSMITTING MEMBER FOR A MECHANICAL BRAKE ASSEMBLY

[75] Inventors: Gene A. Yoak, Ashtabula; Glenn E. McKay, Kingsville, both of Ohio

[73] Assignee: Rockwell International Corporation, Pittsburgh, Pa.

[22] Filed: May 27, 1975

[21] Appl. No.: 581,339

[52] U.S. Cl. .................................. 188/78; 29/509; 188/325

[51] Int. Cl.² ....................................... F16D 51/12

[58] Field of Search ............ 188/78, 325; 74/579 R, 74/519; 29/509; 403/242

[56] References Cited

UNITED STATES PATENTS

| | | | |
|---|---|---|---|
| 1,035,460 | 8/1912 | Minnich | 74/579 |
| 2,395,348 | 2/1946 | Sherman et al. | 29/509 |
| 2,852,105 | 9/1958 | House et al. | 188/78 |
| 2,932,366 | 4/1960 | Williams | 188/78 |
| 2,995,217 | 8/1961 | Van Der Plas | 188/78 |
| 3,039,798 | 6/1962 | Carlson et al. | 29/509 |
| 3,634,928 | 1/1972 | Falcioni | 29/509 |

FOREIGN PATENTS OR APPLICATIONS 201,374  11/1938  Germany ............... 403/242

*Primary Examiner*—Trygve M. Blix
*Assistant Examiner*—Edward R. Kazenske

[57] ABSTRACT

A mechanical brake assembly actuated by pivotal movement of a lever carried by the assembly. Braking force is applied to the brake shoes by motion transmitting members which comprise a link pivotally mounted to a backing plate and an upstanding pin. The pins transfer braking forces from the actuator lever body to the brake shoes while the pivotally mounted links permit movement of the actuating lever to equalize the radial braking force applied to each shoe.

1 Claim, 6 Drawing Figures

MOTION TRANSMITTING MEMBER FOR A MECHANICAL BRAKE ASSEMBLY

BACKGROUND OF THE INVENTION

This invention is directed to an improvement in a mechanical brake assembly and more specifically to an improved motion transmitting member for a brake assembly in which the brake shoes are moved by a floating actuating lever.

A balanced, two shoe internally expanding mechanical brake assembly actuated by a lever pivoting in a plane adjacent the brake shoe webs is disclosed in U.S. Pat. No. 2,852,105 issued to B. E. House et al. on Sept. 16, 1958. That brake assembly offers many advantages including the use of stamped steel brake drums, interchangeable brake shoes and springs, and relatively few moving parts which do not require lubrication. That brake assembly also does not require adjustment because the cam or ramp surfaces provided to the actuating lever body insure sufficient brake shoe movement for balanced braking action throughout the useful life of the brake shoe linings.

In that brake assembly, the braking force is applied to the brake shoes by motion transmitting members which include a boss at one end which is interposed between the actuating lever and a brake shoe. The other end of the motion transmitting member is pivotally mounted to the backing plate. The actuating lever is mounted for pivotal movement about an axis which is not fixed relative to the brake assembly while bearing against the bosses provided by each motion transmitting member. Since the motion transmitting members are pivotally mounted to the backing plate and the actuating lever is freely mounted between the brake shoes and the backing plate, the actuating lever is free to move relative to either brake shoe within the limits of other elements of the assembly. This free movement of the actuating lever between the brake shoes insures that the radial braking force developed by the cam surface or surfaces of the actuating lever will be equally applied to each of the brake shoes. The motion transmitting members thus serve to transmit movement of the actuating lever to the brake shoes and to equalize the radial force applied to each brake shoe. Since none of the elements of the brake assembly, except the abutments are fixed to the backing plate, relatively complex stress patterns may develop in certain elements of the assembly when the brake is actuated under an emergency stopping condition.

The motion transmitting members have traditionally been formed from cast peralitic malleable iron and finished to provide bearing surfaces where necessary in the brake assembly. Although cast iron motion transmitting members have proven satisfactory over many years of service it has recently been noted that such members are relatively brittle in comparison to other elements of the brake assembly which all formed from steel stock, and therefore, may be more likely to fail under emergency stopping conditions than the other elements in the assembly.

The present invention is concerned with this potential problem and provides an improved motion transmitting member for a mechanical brake assembly and a method of making the improved motion transmitting member.

SUMMARY OF THE INVENTION

The present invention is an improved motion transmitting member for a mechanical brake assembly comprising a link having an aperture adjacent each end and a steel pin having one end non-rotatably secured in one of the apertures and the other end normal to and projecting away from one of the major surfaces of the link. In a preferred embodiment, the link and the pin are both formed from steel stock and the pin is formed with a radially extending flange intermediate its oppositely disposed ends. One end of the pin is fitted to the aperture and then upset over an edge provided internally of the aperture with one surface of the flange abutting a major surface of the link.

The method of manufacturing the improved motion transmitting member includes the steps of cutting an elongated member from steel stock, forming a hole adjacent each end of the elongated member, turning one end of a steel pin to a diameter having an interference fit with one of said holes, and press fitting that end of the pin to that hole.

The invention and the manner in which it operates will be described below in connection with the drawings.

DESCRIPTION OF THE DRAWINGS

In the drawings, wherein like reference numerals designate like parts.

DESCRIPTION OF THE INVENTION

Figure 1:
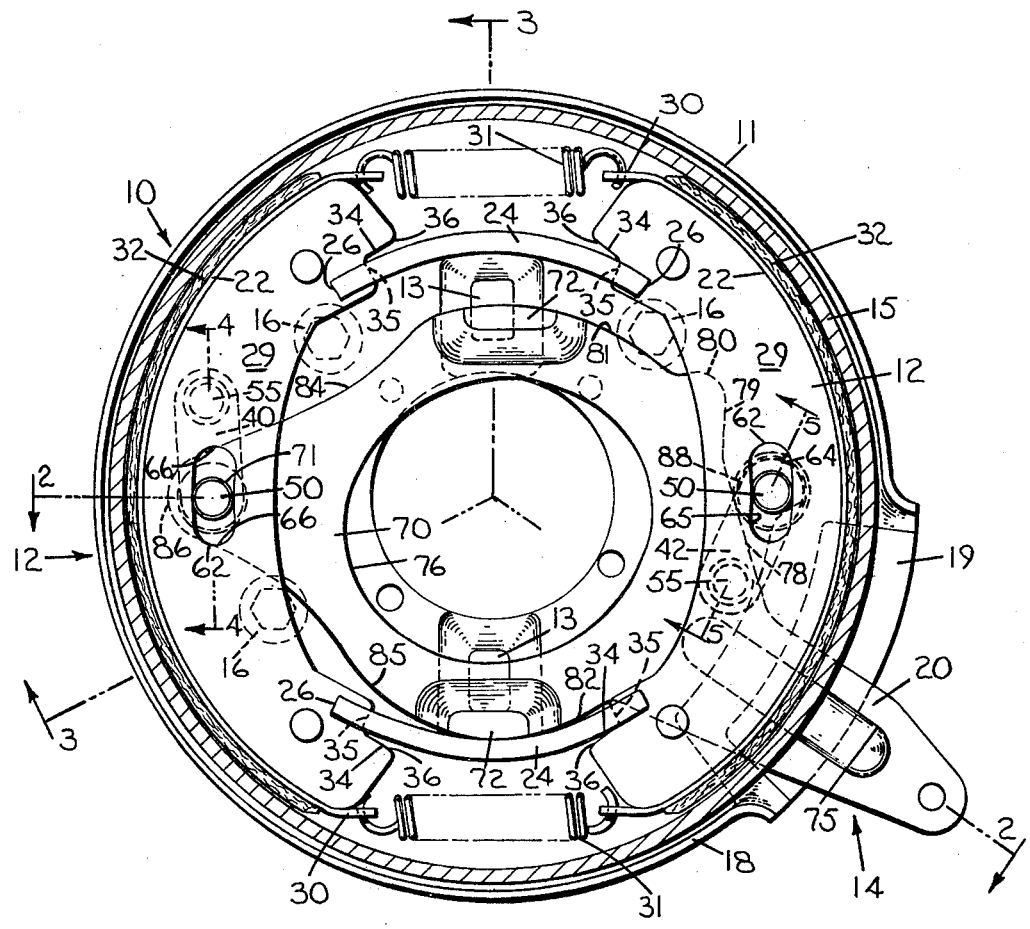
FIG. 1 is an end view of a brake assembly utilizing the improved motion transmitting member.
Figure 2:
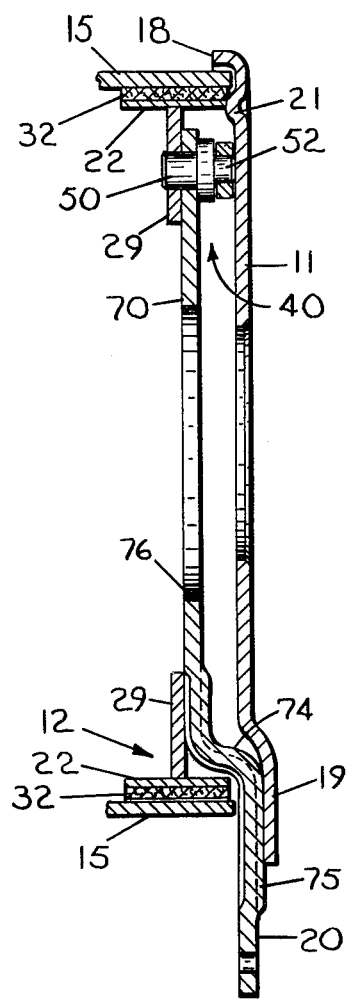
FIG. 2 is a view in section taken along line 2—2 of FIG. 1.
Figure 3:
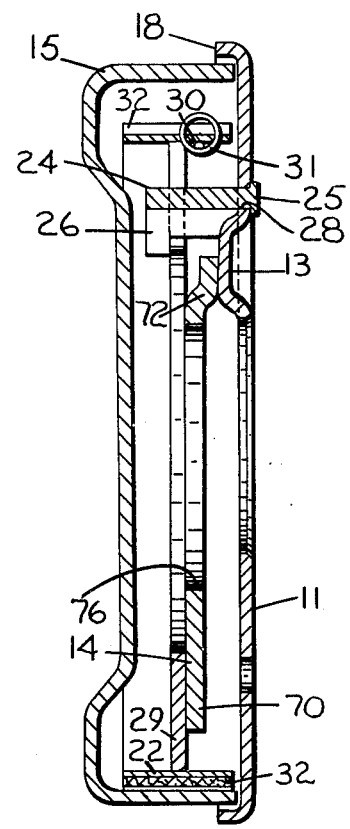
FIG. 3 is a view in section taken along line 3—3 of FIG. 1.

With reference to the drawings particularly FIGS. 1, 2 and 3, there is shown a brake assembly 10 which includes a support or backing plate 11, brake shoes 12, an actuating lever 14 and a brake drum 15.

The brake drum 15 is a steel stamping which may be bolted to a rotating shaft or wheel flange. The backing plate 11, another steel stamping, is mounted to a fixed member (not shown) by bolts 16 and is formed with a lip 18 into which the periphery of brake drum 15 projects. A portion 19 of the lip 18 is laid back to accommodate an outwardly extending arm 20 of the actuating lever 14 and to permit movement of the lever to actuate the brake assembly. The backing plate is also formed to provide diametrically opposed support pads 21 against which the tables 22 of brake shoes 12 rest.

Two identical abutment members 24 are fixed in diametrically opposed relationship on the inside face of backing plate 11. Projections 25 integrally formed on the abutment members 24 extend through slots 28 in the backing plate 11. The projections 25, as best shown by the FIG. 3, are stacked over to rigidly mount the abutment members to the backing plate 11, Each abutment member is also formed with two integral lugs 26 which project laterally away from the abutment member and are spaced from the backing plate 11. The lugs 26 cooperate with one side of the ends of the brake shoe webs 29 to restrain the brake shoes against axial movement away from the backing plate.

Brake shoes 12 are identical and interchangeable. The brake shoe tables 22 have spring fastening openings 30 for anchoring return springs 31. Two openings 30 are provided at each end of the brake shoe tables 22 beyond the respective ends of brake linings 32, one opening on each side of the plane of the brake shoe web 29. Springs 31 fasten to adjacent shoe ends radially outward of the abutment members 24 in the openings 30 that are positioned between the plane of the brake shoe webs 29 and backing plate 22. The springs 31 thus exert a deactuating force on the brake shoes to bias them against the abutment members 24. Since the biasing force is offset on the backing plate side of the shoe webs 29, the springs 31 hold the shoe against the backing plate support pads 21.

Both ends of the brake shoe webs 29 are notched at 34 to provide a set back edge 35 for abutment with the members 24. The sloped side edge 36 of each notch 34 inclines outwardly in order that the brake shoes 12 will be full floating upon actuation of the brake assembly. The intersection of the edge 34 with the sloped edge 36 at each end of the brake shoe webs abuts an oppositely facing edge of one of the members 24 to center the brake shoes when the brake assembly is deactuated.

Figure 6:
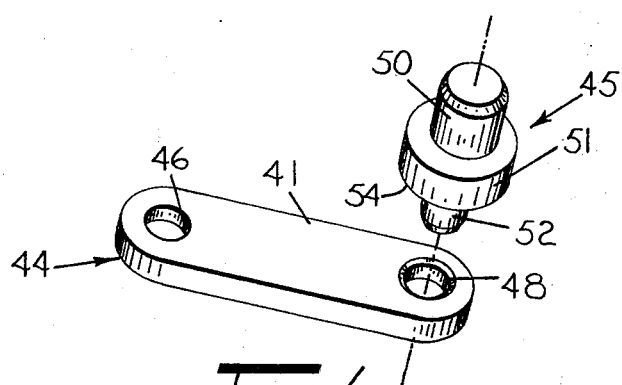
FIG. 6 is a perspective view showing two parts of the motion transmitting member of the present invention.

Motion transmitting members 40 and 42 are mounted to the backing plate 11 by stepped rivets 55 which permit free relative rotational movement of the members about the rivet anchor point. The motion transmitting members 40, 42 are identical in structure. Motion transmitting member 40 will be described in detail with reference to FIGS. 4 and 6, it being understood that motion transmitting member 42 is comprised of identical elements.

Motion transmitting member 40 is comprised of a link 44 and a pin 45. The link 45 is preferable cut from 5/16 inch thick SAE 1035 steel stock and drilled or punched to provide apertures or openings 46 and 48 adjacent each end of the link. The diameter of apertures 46, 48 is preferably about 0.505 to 0.508 inch. The aperture 48 is preferably chamfered at both ends. A 45° chamfer extending about 0.093 inch below the surface of the link 44 has proven satisfactory.

The pin 45 is preferably formed from a suitable length of one and ⅛ inch diameter SAE 1040 steel rod. The rod may be turned on a lathe to provide oppositely spaced ends 50, 52 separated by a radially extending flange 51. The pin end 50 may be turned to a diameter of about 0.750 inch and, as will be described more fully herebelow, serves as a motion transmitting boss of the members 40, 42. The pin end 52 is preferably about 0.405 inch long and is turned to a diameter having an interference fit with the aperture 48 of link 44. A diameter of 0.512 to 0.515 inch has proven satisfactory. The surface 54 thus extends radially outward a distance greater than one-half the diameter of the pin end 52. The flange 51 has an axial length of about 154 inch and the boss end 50 is preferably about ⅝ inch long.

Each motion transmitter member 40, 42 is fabricated by setting each link 44 in a fixture and fitting the end 52 of a pin 45 to the link aperture 48. This step may be performed with a hydraulic press.

The pin end 52 is pressed into the aperture 48 until the surface 54 of the radially extending flange 51 abuts one of the major surfaces 41 of link 44. The pin end 52 preferably extends beyond the intersection of the chamfer at the other end of the aperture 48 and is upset or peened over the edge formed where the chamfer intersects the wall of aperture 48 to firmly and non-rotatably secure the pin 45 to the link 44. The upset end 52 of the pin 45 is preferably entirely displaced into the chamfer provided at that end of the aperture 48.

The aperture 46 is loosely fitted over a one-half inch diameter shank 56 of the mounting rivet 55. The rivets 55 are fitted to one of the openings 57, 58 provided through the backing plate 11. Each rivet 55 tightly embraces the backing plate 11 between the rivet shoulder 59 and the rivet head 60 while permitting a free turning fit between the rivet shank 56 and aperture 46.

The openings 57, 58 through the backing plate 11 are located to position the pins 45 of each motion transmitting member 40, 42 at the mid-point of the brake shoe webs 29. An elongated aperture 62 is provided through the web 29 of each brake shoe 12. Each aperture 62 includes curved edges 64, 65 and rounded end portions 66. The elongated apertures 62 permit slight rotational displacement of the brake shoes 12 relative to the pin bosses 50 when the shoes are moved radially outward into contact with the brake drum 15.

The actuating lever 14 is comprised of the arm 20 and a body portion 70. The body portion 70 is carried in the brake assembly 10 between the backing plate 11 and the webs 29 of the brake shoes 12. The lever 14 is also formed with boss pads 72 which rest against and slide over diametrically opposed pads 13 formed integrally with the backing plate 11. The arm 20 extends radially outward of the assembly between one of the brake shoes 12 and the portion 19 of backing plate 11. The arm 20 is formed with a step 74 and a stiffening rib 75.

The end of the actuating lever remote from the arm 20 is provided with an aperture 71 journalled, with a free turning fit, on the boss end 50 of pin 45 fitted to the motion transmitting member 40. This mounting of the actuating lever 14 to the backing plate 11 permits floating movement of the actuating lever normal to the brake drum axis across the brake assembly for balanced brake shoe actuation. An eliptical opening 76 in the center of the actuating lever 14 provides adequate clearance from an axle shaft or spindle to permit the aforesaid floating movement of the lever 14.

The actuating lever body 70 is formed with a cam surface or ramp edge 78 which extends from the arm 20 to a straight edge 79, which in turn extends to a rounded corner 80. A rounded edge 81 extends from the rounded corner 80 and a second rounded edge 82 on the opposite side of the actuating lever body extends from the arm 20 to merge respectively into curved edges 84 and 85 which converge to a rounded end 86 adjacent the actuating lever aperture 71.

Figure 4:
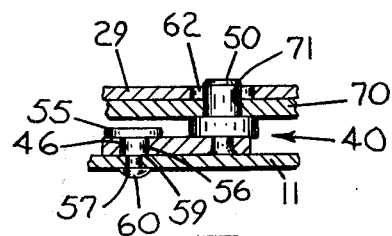
FIGS. 4 and 5 are partial sectional view respectively taken alone lines 4—4 and 5—5 of FIG. 1.
Figure 5:
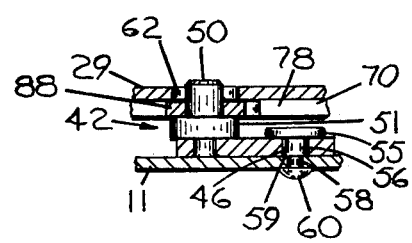

As previously mentioned the pins 45 of the motion transmitting members 40, 42 are located at the mid-point of one of the brake shoes 12. The boss end portions 50 of the pins extend through the elongated apertures 62 provided to the brake shoe webs 29. With reference to FIG. 4 the boss end portion 50 of motion transmitting member 40 projects through the aperture 71 provided to the actuating lever 14 and the brake shoe web aperture 62. As best shown by FIG. 1 and 5, the boss end portion 50 of motion transmitting member 42 projects upward adjacent the ramp edge 78 and through the brake shoe web aperture 62. A rotary bearing or roller 88 is rotatably carried on the flange 51 of motion transmitting member 42 between the boss 50 and ramp edge 78. In FIG. 5, the radial flange 51 provides a bearing surface for the roller 88. In FIG. 4 the corresponding surface of the flange 51 provides a bearing surface for the actuating lever 14.

In operation, as the actuating lever 14 is rotated in a counterclockwise direction about the boss 50 of motion transmitting member 40 to actuate the brake assembly, the ramp surface 78 moves the boss 50 and roller 88 of motion transmitting member 42 and forces the brake shoe engaged by the roller 88 radially outward into contact with the brake drum 15. The wedging force of the ramp surface 78, which forces one brake shoe to contact the brake drum 15, has an equal and opposite reactive force is transmitted through the actuating lever body 70 to the motion transmitting member 40 and the brake shoe at that end of the actuating lever 14. The brake assembly 10 thus, through the actuating lever 14 floating between the pivotally mounted motion transmitting members 40, 42, provides equal braking forces between each brake shoe 12 and the brake drum 15.

The improved motion transmitting members of the present invention have been assembled in a brake assembly and repeatedly subjected to a test simulating an emergency stopping condition. The performance of the brake assembly utilizing the motion transmitting members of the present invention constituted a substantial improvement over a similar brake assembly incorporating the traditional cast iron motion transmitting members. The improved performance of the fabricated steel motion transmitting members is believed to result from the structure of the motion transmitting members in which a substantial area of the radial flange of the pin abuts a major surface of the link to minimize torsional stress in the link, as well as from the greater modulus of elasticity of the steel link.

The improved motion transmitting member of the present invention is not necessarily limited in use to the embodiment described above. The members may be used in combination with an actuating lever having two oppositely disposed ramps instead of a single ramp and an aperture journalled on the boss end of one of the pins. The boss ends of the pins may also be disposed opposite a bearing edge of the brake shoe webs rather than projecting through apertures provided to the brake shoe webs.

The motion transmitting members may also be embodied in other forms without departing from the spirit or essential characteristics of the invention. The foregoing description is therefore to be considered as illustrative and not restrictive, the scope of the invention being defined by the appended claims and all changes which come within the meaning and range of equivalency of the claims are therefore intended to be embraced thereby.

We claim:

1. A brake assembly comprising a support, brake shoes carried by said support for outward displacement into frictional contact with a surrounding brake drum, an actuating lever disposed between said support and said brake shoes, and motion transmitting means mounted to said support, said motion transmitting means comprising a link mounted to said support intermediate said support and said actuating lever, an aperture adjacent each end of said link, means cooperating with one of said apertures to pivotally mount said link to said support, a pin non-rotatably mounted in the other said apertures, said pin including a radially extending flange intermediate oppositely disposed ends thereof with one surface of said flange abutting a major surface of said link, one end of said pin upset interiorly of said other aperture to secure said pin to said link, the other surface of said flange is a bearing surface substantially coplanar with the surface of said lever facing said support, said one surface of said flange extending radially outward a distance greater than one-half the diameter of said one end of said pin and the other end of said pin projecting away from said support between said actuating lever and one of said brake shoes whereby said pin will move said brake shoe radially outward in response to movement of said actuating lever.

* * * * *

UNITED STATES PATENT AND TRADEMARK OFFICE
CERTIFICATE OF CORRECTION

PATENT NO. : 4,016,958

DATED : April 12, 1977

INVENTOR(S) : Gene A. Yoak and Glenn E. McKay

It is certified that error appears in the above-identified patent and that said Letters Patent are hereby corrected as shown below:

Column 1, Line 53, after "cast" delete 'peralitic' and insert --pearlitic--.

Column 1, Line 60, after "which" insert --are--.

Column 2, Line 36, after "sectional" delete 'view' and insert --views--.

Column 3, Line 37, after "link" second occurrence delete '45' and insert --44--.

Column 5. Line 14. after "force" insert --which--.

Signed and Sealed this

Twentieth Day of September 1977

[SEAL]

Attest:

RUTH C. MASON
Attesting Officer

LUTRELLE F. PARKER
Acting Commissioner of Patents and Trademarks